Oct. 21, 1969  W. D. ZEITER  3,473,677
HOIST MECHANISM FOR SILOS AND THE LIKE
Filed Sept. 25, 1967  6 Sheets-Sheet 1
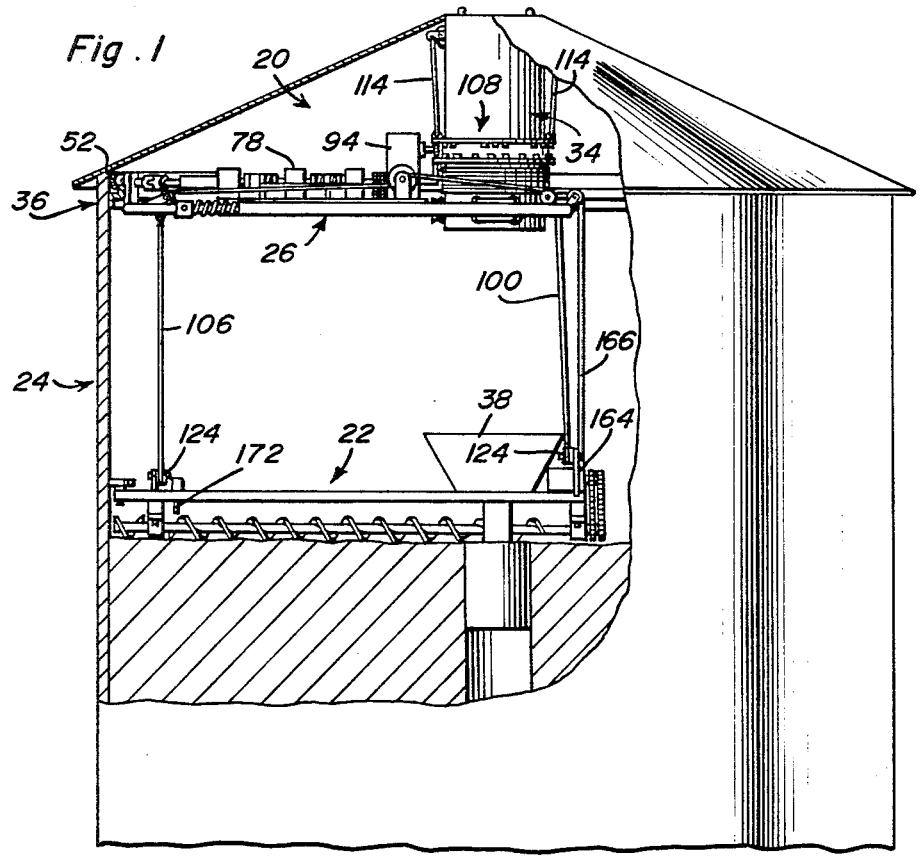
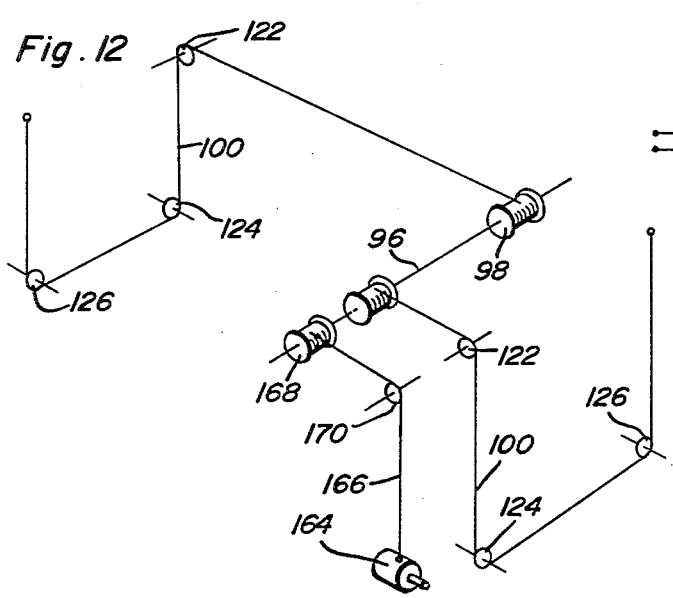
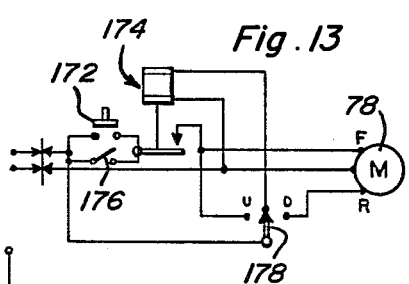
Wayne D. Zeiter
INVENTOR.
BY *Clarence A. O'Brien*
*and Harvey B. Jacobson*
Attorneys

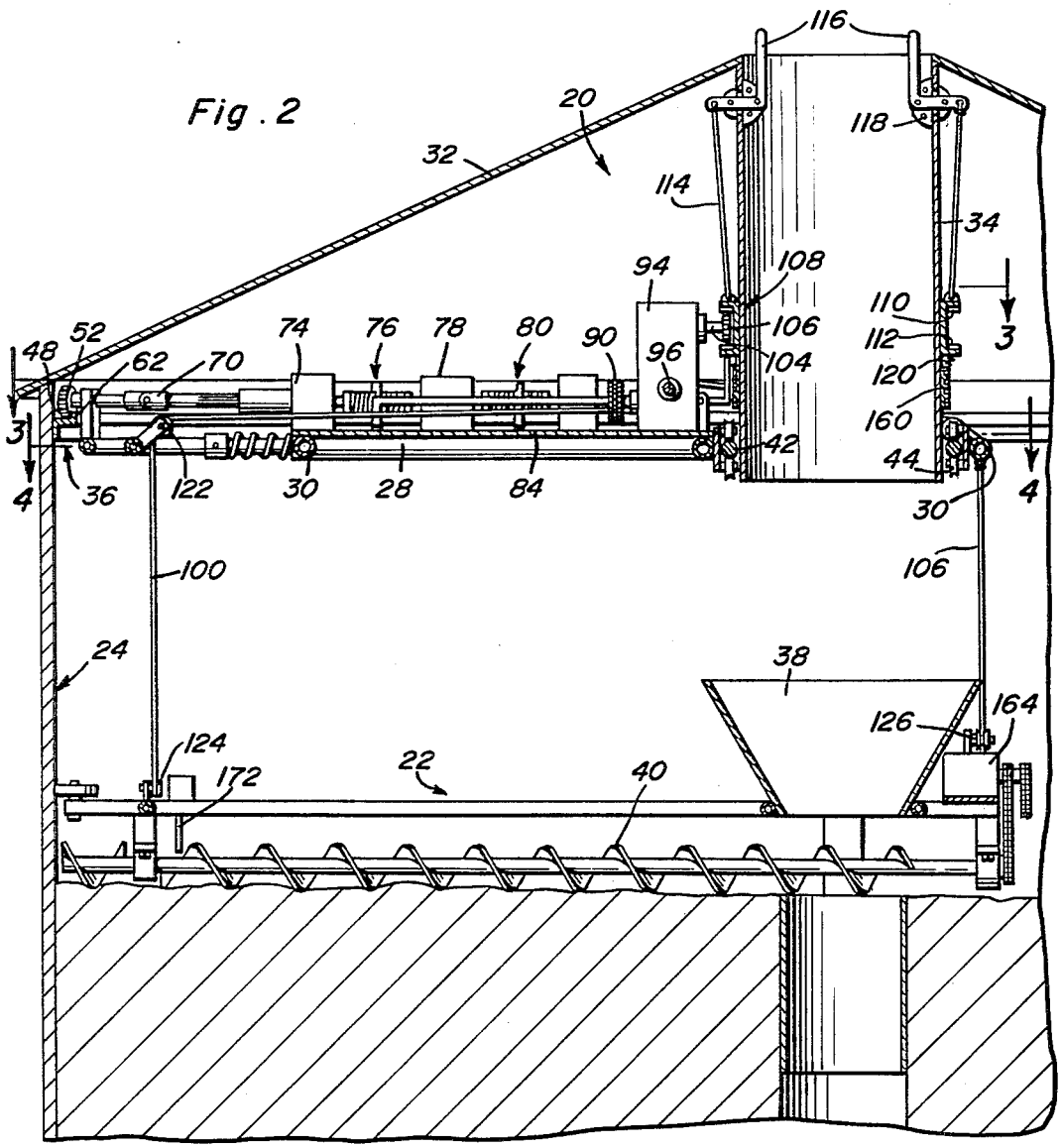
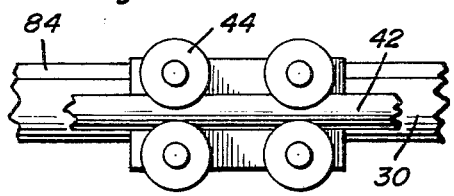

Oct. 21, 1969   W. D. ZEITER   3,473,677
HOIST MECHANISM FOR SILOS AND THE LIKE
Filed Sept. 25, 1967   6 Sheets-Sheet 3

Wayne D. Zeiter
INVENTOR.

Oct. 21, 1969   W. D. ZEITER   3,473,677
HOIST MECHANISM FOR SILOS AND THE LIKE
Filed Sept. 25, 1967   6 Sheets-Sheet 4
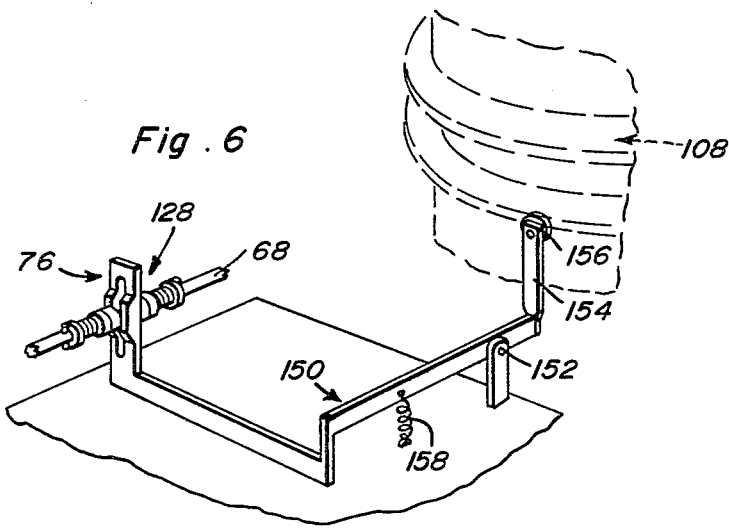
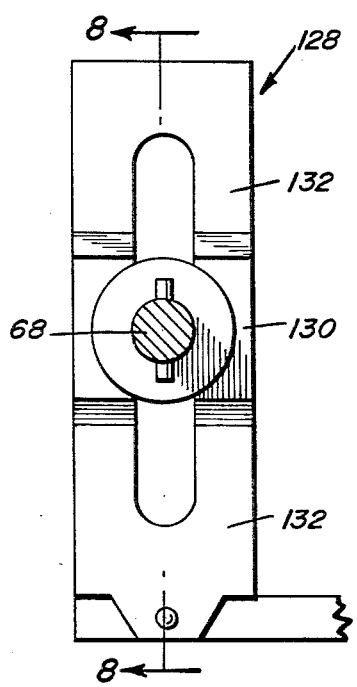
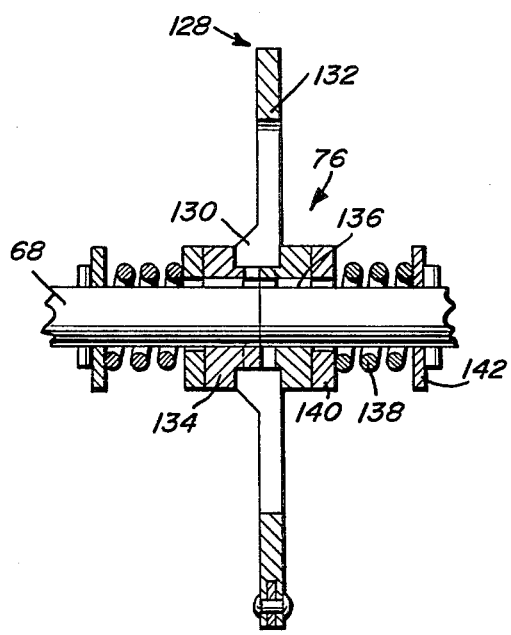
Wayne D. Zeiter
INVENTOR.

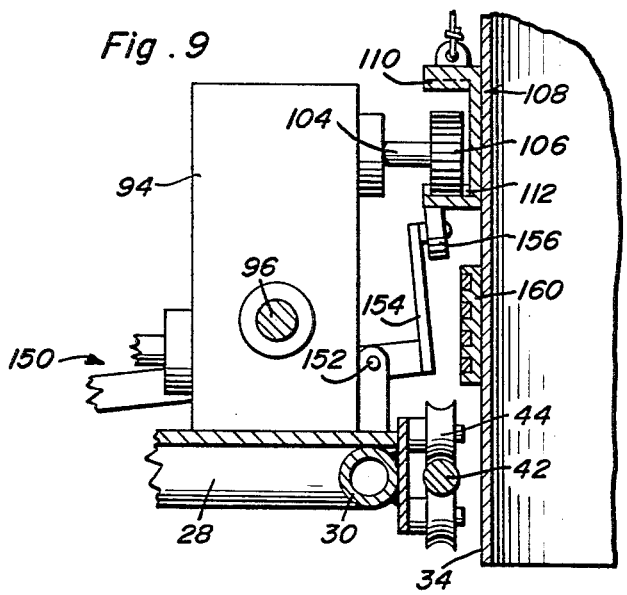
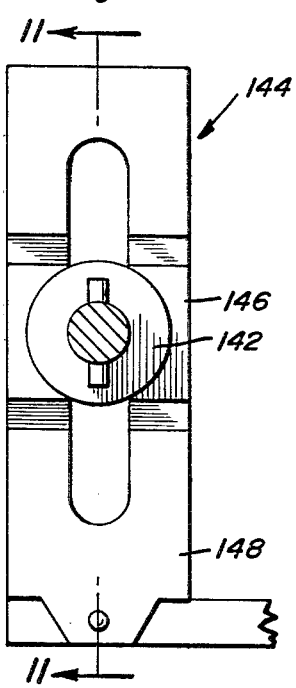
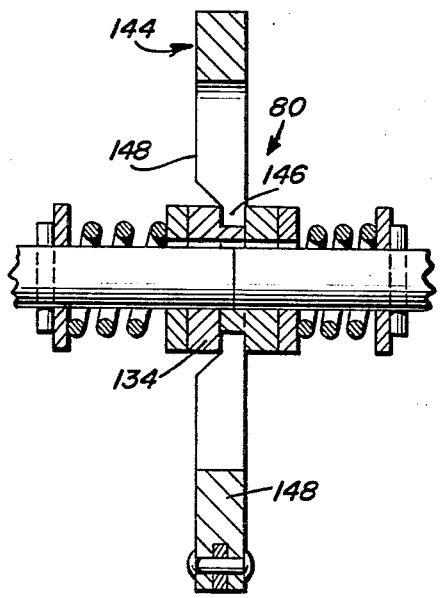

Oct. 21, 1969  W. D. ZEITER  3,473,677
HOIST MECHANISM FOR SILOS AND THE LIKE
Filed Sept. 25, 1967  6 Sheets-Sheet 6

Wayne D. Zeiter
INVENTOR.

United States Patent Office 3,473,677
Patented Oct. 21, 1969

1

3,473,677
HOIST MECHANISM FOR SILOS AND THE LIKE
Wayne D. Zeiter, R.R. 2, Bloomville, Ohio 44818
Filed Sept. 25, 1967, Ser. No. 670,220
Int. Cl. A01f 25/00
U.S. Cl. 214—17                                    16 Claims

ABSTRACT OF THE DISCLOSURE

Apparatus mounted within a silo-type storage structure immediately below the roof and including a system of winch controlled suspension cables for the support of a subjacent silage handling machine or the like which travels in a circular path during its operation. The apparatus, through selectively engageable and disengageable clutch means, will effect a controlled raising and lowering of the supported machine both while the machine is traveling along its rotational or circular path and while the machine is maintained stationary.

The instant invention generally relates to hoisting apparatus, and is more specifically concerned with a hoist mechanism for utilization in conjunction with silo-type storage structures for the suspension of traveling machinery normally operative in such structures, for example silage loading and unloading apparatus or various types of leveling devices.

It is a primary object of the instant invention to provide apparatus which will both suspend and automatically vertically adjust silage handling apparatus or the like within silos, grain drying bins, etc.

In conjunction with the above object, it is also a significant object of the instant invention to provide apparatus which will support the suspended machinery during the normal travel of the machinery about a circular path, while at the same time automatically providing for the necessary vertical travel of the machinery.

In conjunction with the above object, it is also a significant object of the instant invention to provide hoist apparatus which will completely support the suspended machinery so as to insure a level orientation thereof regardless of the condition of the silage or other material being operated upon by the machinery.

Further, it is an important object of the instant invention to provide hoist apparatus which is remotely operable for utilization in oxygen-free silos, and which is at the same time of a rugged construction capable of providing continuous dependable operation requiring little maintenance.

In conjunction with the above object, it is also a significant feature of the instant invention to provide the hoist apparatus immediately below the roof of the silo for easy accessibility thereto should a servicing or maintenance thereof be necessary.

Likewise, it is an important object of the instant invention to provide hoist apparatus which incorporates simplified controls for performing various functions, including both a raising and lowering of the traveling silage handling machinery, as well as the rapid raising or lowering of the machinery when it is not traveling in its operative path about the silo.

Basically, the above objects are achieved utilizing combination hoist and support apparatus which includes a horizontal framework which rotates about a vertically adjustable central control ring with the central control ring, through an adjustment thereof, selectively driving a plurality of winches about which elongated suspension cables are wound. The suspension cables depend below the hoist apparatus and are secured to the particular silage handling machinery whereby a vertical adjustment thereof is effected in response to an extension and retraction of the winch cables.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial elevational view of a silo or the like with a portion broken away so as to illustrate the hoist apparatus of the instant invention mounted in operative position therein and supporting a subjacent silage handling machine;

FIGURE 2 is an enlarged cross-sectional view detailing the structure of FIGURE 1;

FIGURE 5 is a cross-sectional detail taken substantially on a plane passing along line 5—5 in FIGURE 4;

FIGURE 6 is a perspective detail illustrating a clutch and the control linkage therefor;

FIGURE 7 is an enlarged elevational view of the clutch control plate of FIGURE 6;

FIGURE 8 is a cross-sectional detail taken substantially on a plane passing along line 8—8 in FIGURE 7;

FIGURE 9 is a cross-sectional detail illustrating one clutch control linkage in operative engagement with the control ring;

FIGURE 10 is a face view of the second clutch control plate;

FIGURE 11 is a cross-sectional detail taken substantially on a plane passing along line 11—11 in FIGURE 10;

FIGURE 12 is a schematic illustration of the suspension cable arrangement;

Figure 14:
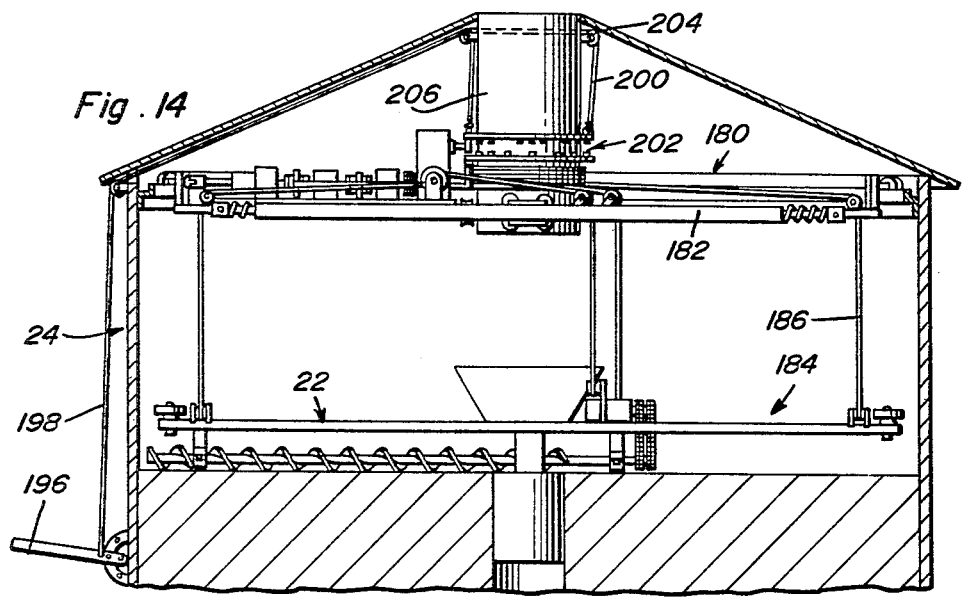
Figure 15:
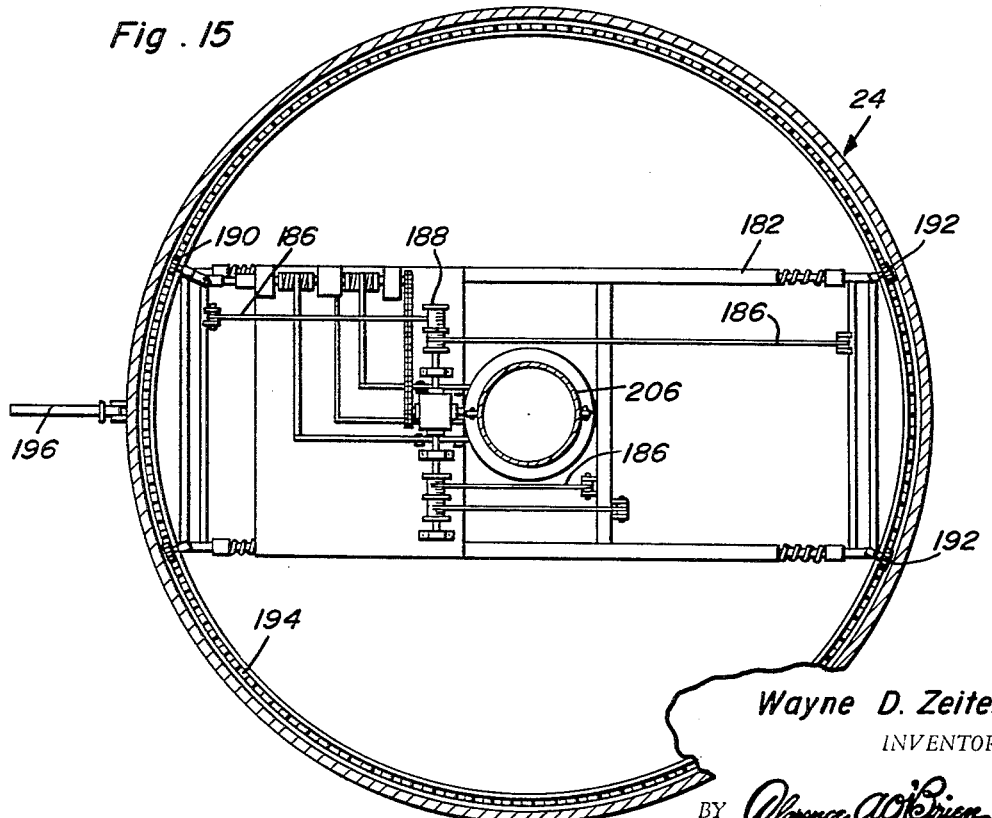

FIGURE 13 schematically illustrates one operative electrical control system;

FIGURE 14 is an elevational view of a slightly modified form of the hoist apparatus of the instant invention; and FIGURE 15 is a top plan view of the apparatus of FIGURE 14.

Referring now more specifically to the drawings, reference numeral 20 is used to generally designate the hoist mechanism or apparatus comprising the instant invention. This apparatus 20 is specifically intended for use in conjunction with a suspended material handling device 22, such as for example the silage handling apparatus disclosed in applicant's Patent No. 3,297,177, within a storage structure 24, which, for purposes of illustration, will be herein referred to as a silo.

Figure 3:
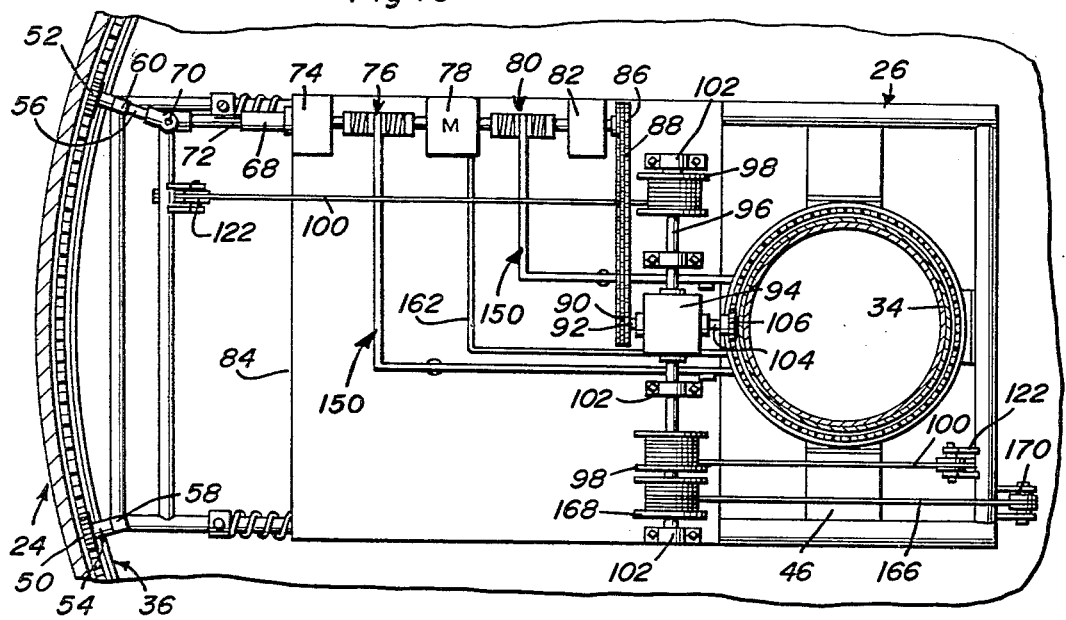
FIGURE 3 is a top plan view of the hoist apparatus taken substantially on a plane passing along line 3—3 in FIGURE 2.
Figure 4:
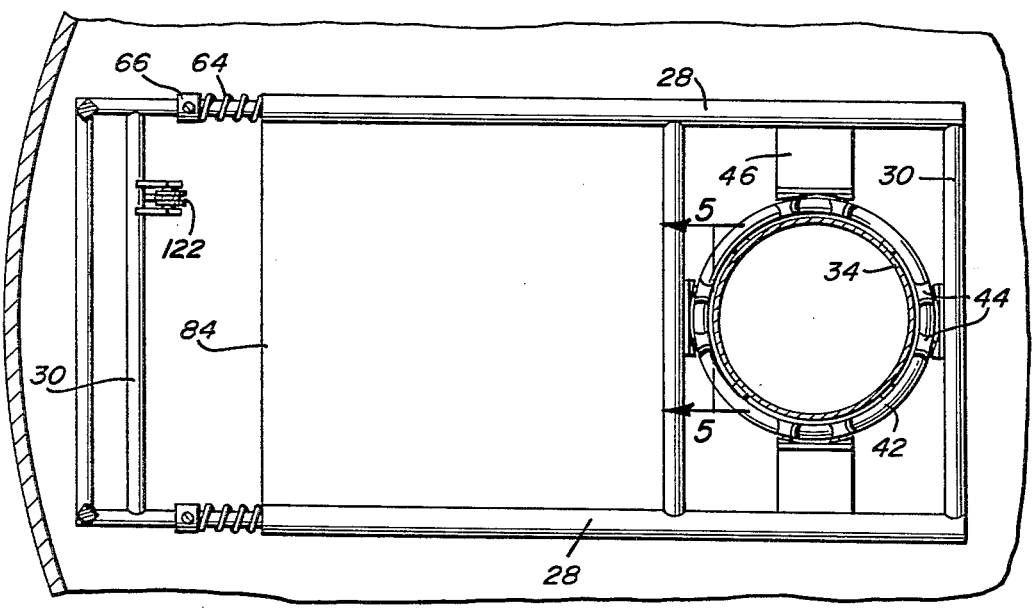
FIGURE 4 is a cross-sectional detail taken substantially on a plane passing along line 4—4 in FIGURE 2.

The apparatus 20 includes a radially orientated horizontal frame 26 including a pair of laterally spaced elongated side beams or tubular pipes 28 rigidly interconnected by several transversely extending beams or pipes 30 located both at the opposite extremities of the beams 28 as well as at selected intermediate points therealong. The support frame 26 is located immediately below the roof 32 of the silo 24 at a height generally corresponding to the eaves of the roof and is supported for travel in a circular path thereabout both by a central flue or filling pipe 34 and a peripheral drive ring 36. The cylindrical tube 34 is rigidly affixed to the silo roof 32 at the apex thereof for the reception therethrough of the introduced silage or the like for direction into the hopper 38 of the subjacent distributing apparatus 22 in a suitable manner, normally utilizing conveying type augers 40. A cylindrical support ring 42 encircles the tube 34 toward the lower end thereof and is rigidly affixed thereto in a manner so as to accommodate upper and lower mounting rollers 44 for free rolling travel therealong. It is contemplated that three or four sets of such rollers 44 be provided on the support frame 26, orientated generally as suggested in FIGURE 4 with the sets of mounting rollers 44 being mounted both on the transverse beams 30 and appropriate brackets 46 rigidly affixed to the side beams 28 and projecting inwardly therefrom toward the rigid feeding tube 34. Each set of mounting rollers 44, noting FIGURE 5, will preferably consist of a pair of spaced upper rollers and a pair of spaced lower rollers grooved so as to receive the support ring 42 therebetween in a manner contemplated so as to allow for the free rolling of the rollers on the ring 42 while at the same time providing a substantial degree of lateral stability.

The drive ring 36 is rigidly affixed to the interior of the silo 24 and forms a continuous horizontal toothed track 48 thereabout. A pair of vertically orientated toothed wheels or gears 50 and 52 ride on the track 48 and are respectively journaled for rotation on shafts 54 and 56, each mounted on a vertical post 58 and 60 affixed to and projecting upwardly from the outer ends of the two side beams 28. In this manner, it will be appreciated that the hoist apparatus support frame 26 is free to swing in a circular path within the silo 24 immediately beneath the roof 32 thereof. In order to retain the toothed wheels 50 and 52 within the drive ring 36, an integral full length upwardly extending retaining flange 62 is provided thereon for engagement immediately inward of the wheels 50 and 52. Further, in order to accommodate any irregularities in the cylindrical silo wall, and in order to assist in retaining the apparatus 20 centralized, the support frame side beams 28 will actually, in each instance, comprise a pair of telescopic sections spring-biased outwardly relative to each other by an expanded coiled compression spring 64 retained by an adjustable abutment collar 66 in a manner which will be readily appreciated from FIGURES 2 and 4 of the drawings.

The wheel or gear 52 actually constitutes a drive gear with the shaft 56 thereof extending rotatably through the corresponding post 60 and being drivingly engaged with a drive shaft 68 through an appropriate universal joint 70. The shaft 68 is provided with an appropriately splined or keyed telescopic section 72 so as to accommodate any necessary slight variation in the length thereof brought about by irregularities in the silo wall. The drive shaft 68, moving inwardly from the outer wall of the silo 24, extends through a first gear box 74, a first clutch 76, the drive motor 78, a second clutch 80, and a second gear box 82. The hoist apparatus frame 26 is provided with an enlarged platform 84 upon which the various mechanisms are mounted. The inner end of the drive shaft 68, which incidently actually comprises a plurality of operatively connected shaft sections, mounts a drive sprocket 86 which drives, through an endless chain 88, a driven sprocket 90 and an associated outwardly projecting shaft 92 of gear box 94 mounted on the platform 84 immediately adjacent the central feeder tube 34. A winch shaft 96 extends laterally outward in opposite directions from the gear box 94 and mounts, in the illustrated embodiment, a pair of winch drums 98 upon which the suspension cables 100 are wound, the shaft 96 itself being supported by suitable bearing units 102. A driven shaft 104 projects outwardly from the gear box 94 toward the central feed tube 34, and mounts, on the outer end thereof, a vertically orientated gear 106 which is received within a channel-shaped annular control ring 108. The control ring 108 is slidably received about the mounting tube 34 and incorporates inwardly directed upper and lower tracks 110 and 112 each defined by a series of gear receiving teeth on the inner face of the corresponding horizontal flange of the control ring 108. The vertical height between the tracks 110 and 112 is such so as to enable a vertical adjustment of the control ring 108 between three positions, a first position wherein the gear 106 engages the upper track 110, a second position wherein the gear 106 is vertically orientated between the tracks 110 and 112 and out of engagement with both, and a third position wherein the gear 106 is in driving engagement with the lower track 112. The actual vertical adjustment of the control ring 108 can be effected by a plurality of elongated cables 114, each anchored to the top of the control ring 108 at spaced points thereabout and extending therefrom to a lever 116 pivotally mounted adjacent the upper end of the feed tube 34 whereby, upon a pivoting of the levers 116 in the appropriate direction, the desired vertical adjustment of the control ring 108 will be achieved. This particular structure is illustrated in FIGURE 2 wherein it will also be noted that any suitable means, such as the apertured plate 118, can be provided for selectively locking the ring adjusting levers 116 in the desired position by means of lockpins engaged through a pin receiving opening in each lever 116 and in the corresponding plate 118. It is contemplated that at least three cables 114 controlled in this manner are to be provided. Further, suitable return springs 120 can be provided between the bottom of the control ring 108 and a portion of the feed tube 34 therebelow so as to assure a proper downward movement of the control ring 108 when a downward shifting thereof is called for.

The drum mounted suspension cables 100 extend from the corresponding winch drums 98 outwardly to the opposite ends of the hoist apparatus frame 26, over appropriately mounted idler pulleys 122. Each of the cables 100 then extends vertically downward to the material handling device 22 where it engages about a second idler pulley 124, extends laterally across the device 22, passes around a third idler pulley 126 also mounted on the handling device 22, and continues upward into fixed engagement with the overhead hoist apparatus frame 26 in generally lateral alignment with the first frame mounted pulley 122. This is schematically illustrated in FIGURE 12 and is intended to show one typical cable arrangement for effecting, in response to an activation of the winch drums 98, means for raising and lowering the handling device 22 relative to the hoist apparatus 20. Other appropriate winch and cable arrangements can be utilized, for example four separate winch drums, each controlling a cable associated with one of the corners of the hoist apparatus and suspended silage or other material handling device 22. Further, it should be appreciated that the cables will either be wound in opposite directions on the drums or, inasmuch as the winch drums 98 are located to opposite sides of the associated shaft driving gear box 94, the two winch drums 98 will actually be driven in opposite direction so as to achieve the synchronized extension or retraction of the cables 100. This will of course be provided for in any conventional manner within the gear box 94 itself.

The suspended material handling device or apparatus 22 will, during the operation thereof, whether it be a silage loader and unloader or a grain leveling unit, travel in a circular path about the silo or storage structure 24. Accordingly, the raising and lowering of the device 22, by means of the winch wound cables 100, is to be automatically effected in response to the traveling of the device 22. Before going into the details as to the manner in which this is effected, attention is specifically directed to FIGURES 6-11 wherein the two clutches 76 and 80 are detailed.

The clutch 76 includes a slotted vertically adjustable clutch control plate 128 which includes a central enlarged clutch disengaging portion 130 and upper and lower relatively narrower clutch engaging portions 132. The two clutch sections 134 are keyed, as at 136 to the corresponding shaft portions for sliding movement relative thereto and are resiliently biased toward each other by expanded compression springs 138 engaged between opposed bearing plates 140 and 142, the plate 140 engaging against the clutch element 134 and the plate 142 being suitably affixed to the shaft portion outwardly thereof so as to define an abutment.

The clutch 80 differs from the clutch 76 in that the clutch control plate 144 thereof includes a central reduced thickness clutch engaging portion 146 and two relatively wider clutch disengaging end portions 148 whereby upon a vertical shifting of the clutch control plate 144 of the clutch 80 from the centralized orientation thereof as illustrated in FIGURE 11, the opposed clutch sections 134 will disengage.

Both clutch control plates 128 and 144 are adjustable in direct response to a vertical adjustment of the control ring 108 through linkage members 150. Each of the linkage members 150 is pivotally secured at an intermediate point along the length thereof, as at 152, and has a first vertically projecting end 154 thereof positioned in bearing engagement, through a freely rotating roller or wheel 156, with the lower face of the control ring 108. The second end of each linkage member 150 is affixed to the corresponding clutch control plate 128 or 144. The control ring engaging roller 156, provided specifically for reducing the friction therebetween, is maintained in engagement with the control ring 108 by an appropriate resilient biasing member or spring 158 engaged between each clutch link member 150 and the frame or frame platform 84 to the opposite side of the point of pivotal support 192 from the control ring engaging link end portion 154. It is believed that this arrangement will be readily apparent from the perspective detail of FIGURE 6. The two clutch link members 150 are so formed as to effect a disengagement of clutch 80 and a corresponding engagement of clutch 76 when the control ring 108 is in each of its two extreme positions, that is engaging the gear 106 with either the track 110 or the track 112. By the same token, when the control ring 108 is at its intermediate position, that is when the gear 106 is out of engagement with both tracks 110 and 112, the clutch 80 will be engaged, and the clutch 76 will be disengaged. The purpose for this shall be explained presently.

In operation, assuming initially a raising of the material handling device 22 such as would be required during a loading of a silo, the control ring 108 is shifted upward so as to engage the gear 106 with the lower control ring track 112. This will engage the clutch 76 and disengage the clutch 80. The motor 78 is then activated, driving the drive ring gear 52 through the shaft 68. This in turn produces a circular traveling of the hoist apparatus 20 about the stationary center support tube 34 with this circular traveling of the apparatus 20 also effecting a circular traveling of the handling device 22 suspended therefrom. As the hoist apparatus frame 26 travels about the support tube 34, the gear 106 is caused to rotate through an engagement with the teeth of the lower control ring track 112, the control ring 108 of course remaining stationary relative to the rotating hoist apparatus frame 26 so as to achieve the desired rotation of the gear 106. This driving of the gear 106, as it travels about the control ring 108, produces, through the gear box 94, a driving of the winch shaft 96, producing in turn a synchronized reeling in of the cables 100 and a gradual raising of the handling device or apparatus 22 along a general upwardly spiraling path. In this manner, the desired filling of the silo 24 can be effected, the material, as noted previously, being introduced into the central hopper 38 through the overhead feeding tube 34.

The lowering operation, such as would be desired when utilizing the device 22 to unload silage, is effected through a lowering of the control ring 108 so as to engage the upper control ring track 110 with the gear 106. This in turn, through the linkage members 150, shifts the clutch control plates 128 and 144 to their opposite extremes, the clutch 76 still being engaged and the clutch 80 still being disengaged. In this position, upon an activation of the motor 78, the driven shaft 68 walks the drive ring engaging gear 52 about the drive ring 36 and consequently rotates the hoist apparatus frame 26 about the stationary control ring 108 in a manner whereby the engagement of the gear 106 with the upper control ring track 110 results in a rotational driving of the gear 106, and, through the gear box 94, the winch shaft 96 in the opposite direction so as to produce an unwinding or unreeling of the suspension cables 100. In this manner, the material handling device 22 will follow a downwardly directed generally spiral path. Incidently, inasmuch as, in the unloading operation, the silage or the like will normally be scraped from the top, the lowering operation would necessarily have to occur at a substantially lesser rate than the raising operation. For example, it is contemplated that the device 22, assuming a silage loader and unloader, be lowered approximately one half inch for each revolution about the silo, and by the same token, be raised approximately twelve to twenty inches for each revolution during the filling operation. This can easily be effected or provided for by varying the spacing of the gear engaging teeth on the upper and lower control ring tracks 110 and 112. In other words, the teeth on the lower track 112 would be so spaced as to effect substantially a continuous driving of the gear 106, while the teeth on the upper track 110 would be spaced so as to effect a much less frequent or slower driving of the gear 106. Incidently, inasmuch as the movement of the gear 106 about the control ring 108 is to effect a corresponding driving of the gear 106, it will be appreciated that the control ring 108 is mounted on the central tube 34 in a manner so as to, while allowing for the desired vertical adjustment thereof, prevent any slipping thereof around the tube 34.

In the raising and lowering operations described above, both being effected in response to the travel of the apparatus 20 and the device 22 about the interior of the silo 24, the sprocket 86 mounted on the inner end of the shaft 68 was in effect disengaged through the disengagement of the clutch 80. It is through the clutch 80 and the sprocket 86 that the instant invention also provides for the vertical raising and lowering of the suspended apparatus 22 independent of the circular travel aforedescribed in connection with the raising and lowering operation. More particularly, upon a shifting of the control ring 108 to its central position, the gear 106 disengages with both tracks 110 and 112, and at the same time, the clutch linkages 150 disengage the clutch 76 and engage the clutch 80. With this set-up, an activation of the motor 78 will effect a rotational driving of the sprocket 86 and no driving of the drive ring engaging gear 52. The sprocket 86 in turn drives the gear box sprocket 90 which will effect, through the gear box 94, a driving of the winch shaft 96. The motor 78, being in the nature of a reversible motor, can be activated so as to drive the shaft 96 in either direction, thereby effecting either a rapid raising or a rapid lowering of the cable suspended device 22.

In order to connect the motor 78 with an appropriate source of electrical energy, it is contemplated that, as one example, a conventional brush and slip ring arrangement be provided, the collector rings 160 encircling the feeding tube or cylinder 34 and communicated to the motor 78 through a suitable conductor wire 162 having the appropriate brushes mounted on the end thereof for engagement with the collector rings 160. By the same token, it is contemplated that the power to operate the motor or motors 164 of the suspended device 22 also be provided from the same source with a winch wound conductor cable 166 being mounted on an appropriate winch drum 168 on the shaft 96, with the drums 98, the cable 166 extending over an appropriate frame mounted pulley 170 and extending downwardly into contacting engagement with the motor 164. In this manner, as the shaft 96 is rotated, and a corresponding raising or lowering of the device 22 effected, the current supplying cable 166 will simultaneously be extended or or retracted.

Attention is now specifically directed to the exemplary circuit diagram of FIGURE 13 which illustrates one manner in which the desired control of the raising and lowering operations can be effected. During the silo filling operation, the loading device 22 can have a pressure switch 172 associated with the outer end thereof, much like the pressure switch 176 in Patent No. 3,297,177. This pressure switch 172, when thrown by the silage piling thereagainst, closes a circuit through an energized relay system 174 and activates the motor. During the unloading operation, a limit switch 176 will be, for example in response to a movement of the control ring 108, maintained closed so as to effect an operation of the motor 78 independent of the pressure switch 172. Finally, a manual switch 178 can be utilized so as to deenergize the relay circuit and effect a selective reversing of the motor 78 independent of the pressure or limit switches.

Referring now to FIGURES 14 and 15, it will be noted that a slightly modified form of apparatus 180 has been illustrated therein. This modification consists of running the hoist frame 182 completely across the interior of the the silo 24 for engagement with diametrically opposed portions thereof. The suspended apparatus 184, illustrated as a silage loader and unloader, will also have the frame thereof extended for the full diameter of the silo with the suspension cables 186, and such additional winches 188 as deemed necessary, being added to the basic unit heretofore described. These cables 186 will support the opposite ends of the suspended device 184, as well as the central portion thereof should such support be deemed necessary. The actual driving of the apparatus 180 about the circular path will be effected in the same manner as described above from one of the drive ring supported gears 190 with the three remaining gears 192 tracking along the drive ring 194 in a freely rotating manner. One other difference which will be noted in FIGURE 14 is the utilization of a control ring positioning lever 196 mounted on the exterior of the silo 24 and engaged by a common cable 198 with a plurality of control ring supporting cables 200 affixed to the control ring 202 and extending upwardly therefrom over peripherally spaced pulleys 204 affixed to the upper portion of the feed tube or cylinder 206.

From the foregoing, it will be appreciated that a unique suspension and control system has been devised for use in connection with silage handling apparatus and the like. The hoist apparatus of the instant invention is permanently mounted adjacent the top of the silo, and as such, is readily accessible for service or maintenance through the roof hatch. The hoist apparatus is adapted to constitute the sole support for the suspended device which, as an example, when the suspended device constitutes a silage handling machine, is particularly significant in that an even packing of the silage can be easily effected, regardless of the moisture and density of the silage. This results in a significant improvement over previous arrangements wherein the loader necessarily had to ride directly on the silage pack and would thus have a tendency to sink into fluffy material and ride high on more solid material which in turn would produce a progressively more uneven pack. It will of course be appreciated that the length of the suspension cables 100 is to be such so as to allow for a utilization of the full height of the silo 24.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. Hoist apparatus for traveling material handling machinery, said apparatus comprising a rigid fixed support, a movable hoist frame mounted on said support for travel relative thereto, suspension means mounted on said frame for travel therewith and depending from said frame for engagement with the material handling machinery, and means for effecting a selective extension and retraction of said suspension means, and consequently said material handling machinery, relative to said movable frame in response to a traveling movement of said frame relative to said fixed support.

2. The apparatus of claim 1 wherein the means for effecting the extension and retraction of the suspension means comprises a pair of operatively engaged units, one unit being movably mounted on said movable frame and one unit being movably mounted on said rigid fixed support, the frame unit being engaged with the suspension means for effecting controlled movement thereof, and means for moving the support unit for varying the operative engagement between said units for varying the direction of movement of the frame unit and hence effecting the selective extension or retraction of said suspension means.

3. Hoist apparatus for traveling material handling machinery, said apparatus comprising a rigid support, a hoist frame mounted on said support for travel relative thereto, suspension means depending from said frame for engagement with the material handling machinery, and means for effecting a selective extension and retraction of said suspension means in respose to a traveling movement of said frame relative to said support, said means for effecting the extension and retraction of the suspenion means comprising a pair of operatively engaged units, one unit being movably mounted on said frame and one unit being mounted on said rigid support, the frame unit being engaged with the suspension means for effecting controlled movement thereof, and means for varying the operative engagement between said units for varying the direction of movement of the frame unit and hence effecting the selective extension or retraction of said suspension means, the operatively engaged units comprising gear means on said frame and track means on said rigid support drivingly receiving said gear means, said track means including a pair of track portions, said track means being adjustably mounted for selectively engaging each track portion with the gear means independent of the other track portion for varying the direction of movement of the gear means, said means for varying the operative engagement between said units comprising means engaged with said track means for movement thereof to selectively engage the track portions.

4. The apparatus of claim 3 including means for effecting a traveling movement of the hoist frame, said gear means traveling in said track means in response to a traveling movement of the hoist frame and being driven by a selected one of said track portions.

5. The apparatus of claim 4 wherein said suspension means comprises cable means, winch means mounted on said hoist frame and receiving said cable means, said gear means being drivingly engaged with said winch means for effecting a driving thereof in response to a driven movement of the gear means.

6. The apparatus of claim 5 including means for driving said winch means independent of said gear means and a traveling movement of the frame.

7. The apparatus of claim 6 wherein the means for effecting a traveling movement of the frame comprises a motor mounted on said frame, a shaft driven by said motor, drive gear means on said shaft for rotation therewith, a fixed drive track along the path of movement of said frame, said drive gear means engaging in said drive track for travel therealong in response to a rotation of said shaft so as to effect a traveling movement of said frame.

8. The apparatus of claim 7 wherein said means for driving said winch means independent of said gear means is operatively connected to and driven by said motor, and clutch means for selectively engaging and driving the drive gear means for effecting a traveling movement of the frame, and the means for driving said winch means independent of the travel of the frame.

9. Hoist apparatus for mounting and controlling material handling machinery within a vertical storage structure, means for effecting a horizontal traveling movement of said apparatus within the structure, said apparatus including depending selectively extension and retractable suspension means mounted thereon for travel therewith and depending therefrom for engagement with a machine suspended thereby, means for effecting a selected extension and retraction of said suspension means in response to a traveling movement of the apparatus, and means for effecting a selected extension and retraction of said suspension means independent of a traveling movement of the apparatus.

10. The apparatus of claim 9 wherein said suspension means comprises cables, said apparatus including a movable frame, winch means on said frame, said means for effecting an extension and retraction of the suspension means in response to a traveling movement of the apparatus comprising gear means drivingly engaged with said winch means, track means fixed relative to the movable frame, said gear means being received within said track means for travel thereabout in response to movement of the frame, said track means effecting a driving of the received gear means in response to a travel of the gear means therein, and means for adjusting the relationship between the gear means and the track means whereby the selective extension or retraction of the suspension means can be effected.

11. In a silo type storage structure, a roof, a vertically elongated cylindrical member secured to said structure centrally therein immediately below said roof, said structure including a cylindrical outer wall, a horizontal hoist frame, means mounting one end of said frame on the outer wall for travel in a circular path thereabout, means mounting a portion of said frame on said cylindrical member for swinging movement of the frame thereabout in a generally horizontal plane in conjunction with the travel of said one end of the frame in a path about the outer wall, winch means on said frame, cable means extending from and controlled by said winch means, said cable means depending below said frame at longitudinally spaced points, including a point adjacent the outer wall and a second point adjacent said cylindrical member, for supporting engagement with silage handling apparatus, a circular gear track surrounding said cylindrical member, gear means mounted on said frame and operatively engaged with said winch means, said gear means being drivingly engaged with said gear track for driving thereby in response to the movement of said frame for effecting a driving of the winch means and a selective movement of the cable means so as to vary the relative vertical position of supported silage handling apparatus.

12. In a silo type storage structure, a roof, a vertically elongated cylindrical member secured to said structure centrally therein immediately below said roof, said structure including a cylindrical outer wall, a horizontal hoist frame, means mounting one end of said frame on the outer wall for travel in a circular path thereabout, means mounting a portion of said frame on said cylindrical member for swinging movement of the frame thereabout in a generally horizontal plane in conjunction with the travel of said one end of the frame in a path about the outer wall, winch means on said frame, cable means extending from and controlled by said winch means, said cable means depending below said frame at longitudinally spaced points, including a point adjacent the outer wall and a second point adjacent said cylindrical member, for supporting engagement with silage handling apparatus, a circular gear track surrounding said cylindrical member, gear means mounted on said frame and operatively engaged with said winch means, said gear means being drivingly engaged with said gear track for driving thereby in response to the movement of said frame for effecting a driving of the winch means and a selective extension and retraction of the cable means, said cylindrical member mounted gear track including vertically spaced track portions selectively and independently engageable with said gear means for effecting a driving of the gear means, and hence the winch means, in opposite direction, thereby effecting the selected extension or retraction of the cable means, means for effecting a vertical adjustment of said gear track for a selective engagement of one of said track portions with said gear means, said means mounting one end of the frame including a drive track fixed to the outer wall, a drive gear engaged with said drive track, shaft means on said drive gear, motor means mounted on said frame and drivingly engaged with said drive gear shaft means for effecting, through a driving of the shaft means and the drive gear, the traveling movement of said frame.

13. The construction of claim 12 including drive means operatively driven by said motor means and drivingly engaged with said winch means for effecting a selective driving of the winch means, and clutch means for selectively disengaging said drive gear from said motor means and engaging said drive means with said motor means, and conversely disengaging said drive means from said motor means and engaging said drive gear with said motor means, thereby effecting a selective driving of said winch means by either the traveling movement of the frame or by the motor driven drive means.

14. The apparatus of claim 3 wherein said hoist frame is mounted within a silo type storage structure, said structure including a roof, a vertically elongated cylindrical member secured to said structure centrally therein immediately below said roof, said cylindrical member comprising the aforementioned rigid support, said track means encircling said cylindrical member, said hoist frame traveling in a circular path about said cylindrical member, said structure including a cylindrical outer wall, the hoist frame extending from the centrally located cylindrical member to the surrounding cylindrical outer wall, and means mounting the opposite ends of said frame on said cylindrical member and surrounding cylindrical outer wall for travel about the interior of the structure.

15. Hoist apparatus for traveling material handling machinery, said apparatus comprising a rigid support, a movable hoist frame mounted on said support for travel relative thereto, suspension means mounted on said frame for travel therewith and depending from said frame for engagement with the material handling machinery, and means for effecting a vertical movement of said suspension means, and consequently said material handling machinery, relative to said movable frame in response to a traveling movement of said frame relative to said support, the means for effecting the vertical movement of the suspension means comprising a pair of operatively engaged units, one unit being movably mounted on said movable frame and one unit being mounted on said rigid support, the frame unit being engaged with the suspension means for effecting controlled movement thereof, and means for selectively engaging the units, the operatively engaged units comprising gear means on said frame and track means on said rigid support drivingly receiving said gear means whereby upon a selective engagement of the gear means with the track means, and a traveling movement of the hoist frame, said gear means travels in said track means and effects the controlled movement of the suspension means.

16. The apparatus of claim 15 wherein the means for selectively engaging the units comprises means engaged with said track means for a movement thereof relative to the rigid support, said track means being movably mounted on said rigid support.

References Cited

UNITED STATES PATENTS

| | | | |
|---|---|---|---|
| 921,021 | 5/1909 | Stehling | 214—17 |
| 2,430,203 | 11/1947 | Bailey | 214—17 |
| 2,649,215 | 8/1953 | Dickson | 214—17 |
| 2,718,969 | 9/1955 | Cordis | 214—17 |
| 2,719,058 | 9/1955 | Van Dusen | 214—17 |

ROBERT G. SHERIDAN, Primary Examiner